United States Patent
Miyashita et al.

(10) Patent No.: US 9,660,490 B2
(45) Date of Patent: May 23, 2017

(54) PERMANENT MAGNET TYPE MOTOR AND METHOD FOR MANUFACTURING PERMANENT MAGNET TYPE MOTOR

(71) Applicant: SANYO DENKI CO., LTD., Tokyo (JP)

(72) Inventors: Toshihito Miyashita, Tokyo (JP); Manabu Horiuchi, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 624 days.

(21) Appl. No.: 13/967,482

(22) Filed: Aug. 15, 2013

(65) Prior Publication Data
US 2014/0054997 A1 Feb. 27, 2014

(30) Foreign Application Priority Data

Aug. 23, 2012 (JP) .................................. 2012-184303

(51) Int. Cl.
*H02K 15/03* (2006.01)
*H02K 1/27* (2006.01)
*H02K 1/02* (2006.01)

(52) U.S. Cl.
CPC .............. *H02K 1/2706* (2013.01); *H02K 1/02* (2013.01); *H02K 1/276* (2013.01); *H02K 15/03* (2013.01); *Y10T 29/49012* (2015.01)

(58) Field of Classification Search
CPC ........ H02K 1/02; H02K 1/276; H02K 1/2766; H02K 15/03
See application file for complete search history.

(56) References Cited

U.S. PATENT DOCUMENTS

| | | | |
|---|---|---|---|
| 5,861,696 A | * | 1/1999 | Hartman .............. H02K 1/2786 29/598 |
| 2005/0127983 A1 | | 6/2005 | Takagi et al. |
| 2010/0109468 A1 | | 5/2010 | Natsumeda et al. |
| 2011/0234038 A1 | * | 9/2011 | Kobayashi ............... H02K 1/02 310/156.43 |
| 2015/0171676 A1 | | 6/2015 | Kobayashi et al. |

FOREIGN PATENT DOCUMENTS

| | | |
|---|---|---|
| CN | 102201711 A | 9/2011 |
| JP | H10-164804 A | 6/1998 |
| JP | 2005176509 A | 6/2005 |
| WO | WO-2008/123251 A1 | 10/2008 |

OTHER PUBLICATIONS

JP OA from counterpart case JP2012-184303 dated Dec. 8, 2015.
Office Action dated Sep. 8, 2016 from Chinese Patent Application No. 201310351506.2, pp. 1-6.

* cited by examiner

*Primary Examiner* — Dang Le
(74) *Attorney, Agent, or Firm* — Polsinelli PC (57) ABSTRACT

Provided is a permanent magnet type motor capable of improving a demagnetization proof stress almost without lowering a generated torque, and reducing a torque ripple and a cogging torque by improving a gap magnetic flux density distribution. Portions having a low demagnetization proof stress of a plurality of permanent magnets incorporated into a rotor core are partially and equally demagnetized.

9 Claims, 7 Drawing Sheets

PERMANENT MAGNET TYPE MOTOR AND METHOD FOR MANUFACTURING PERMANENT MAGNET TYPE MOTOR

CROSS-REFERENCE TO RELATED APPLICATION

This application claims priority to Japanese Application No. 2012-184303, filed Aug. 23, 2012, the entirety of which is incorporated herein by reference.

BACKGROUND

1. Technical Field

The present invention relates to a permanent magnet type motor having a permanent magnet disposed on a rotor, and a method for manufacturing the permanent magnet type motor.

2. Description of the Related Arts

In a permanent magnet type motor, an operating environment temperature and a generated torque are limited by a demagnetization proof stress of a permanent magnet. For example, in rare-earth magnets such as a neodymium magnet, "high-temperature demagnetization" occurs wherein as the operating temperature rises, the demagnetization proof stress drops. Thus, the rare-earth magnets need to be managed in terms of an upper limit of the operating environment temperature and an upper limit of the generated torque under a high-temperature environment.

In order to improve demagnetization proof stress of a permanent magnet type motor, there are a shape-wise improvement of the permanent magnet such as an increase in the thickness of the permanent magnet, and a plan to improve a rotor structure. Furthermore, the demagnetization proof stress of a permanent magnet type motor can also be improved by an improvement in a material of the permanent magnet, such as use of a permanent magnet having a high intrinsic coercive force.

As a technique concerning an improvement in the magnet shape of the permanent magnet, a technique that physically forms a notch in a corner portion of the permanent magnet to intend a drop of a cogging torque and an improvement in the magnetic flux density distribution has been disclosed (for example, see Japanese Patent Application Laid-Open Publication No. 05-176509).

SUMMARY

Incidentally, although the technique of the above Japanese Patent document intends the drop in the cogging torque and the improvement in the magnetic flux density distribution by improving the shape of the permanent magnet, it cannot be said that the technique positively intends the improvement in the demagnetization proof stress. The improvements in the shape and the material of the permanent magnet lead to the cost increase of the permanent magnet.

Furthermore, a technique for improving the demagnetization proof stress by a magnetizer can also be considered. However, it is very difficult to control the magnetization itself, and it is not easy to control the product variation.

Accordingly, a technique for improving the demagnetization proof stress regardless of the shape and the material of the permanent magnet has been desired.

The invention has been made in view of the above circumstances, and an object thereof is to provide a permanent magnet motor capable of improving the demagnetization proof stress almost without lowering the generated torque and capable of reducing the torque ripple and the cogging torque by improving a gap magnetic flux density distribution, and a method for manufacturing the permanent magnet type motor.

In order to achieve the above-mentioned object, according to the present invention, there is provided a permanent magnet type motor in which a permanent magnet is disposed in a rotor core. A portion having a low demagnetization proof stress of the permanent magnet is partially and equally demagnetized.

According to the present invention, the portion having the low demagnetization proof stress of the permanent magnet is partially and equally demagnetized. By demagnetizing the portion having the low demagnetization proof stress of the permanent magnet, it is possible to improve the demagnetization proof stress of the permanent magnet almost without lowering the generated torque.

Furthermore, by partially and equally demagnetizing the portion having the low demagnetization proof stress of the permanent magnet, the gap magnetic flux density distribution improves, and thus the torque ripple and the cogging torque can be reduced.

DETAILED DESCRIPTION

Herein below, a permanent magnet type motor, and a method for manufacturing the permanent magnet type motor according to the embodiments will be described with reference to the drawings.

The permanent magnet type motors according to the first to the third embodiments are able to improve the demagnetization proof stress almost without lowering the generated torque and realize the reduction in the torque ripple and the cogging torque, by partially demagnetizing portions having a low demagnetization proof stress of a plurality of permanent magnets at the time of manufacturing the motor.

[First Embodiment]

[Configuration of Permanent Magnet Type Motor]

Figure 1:
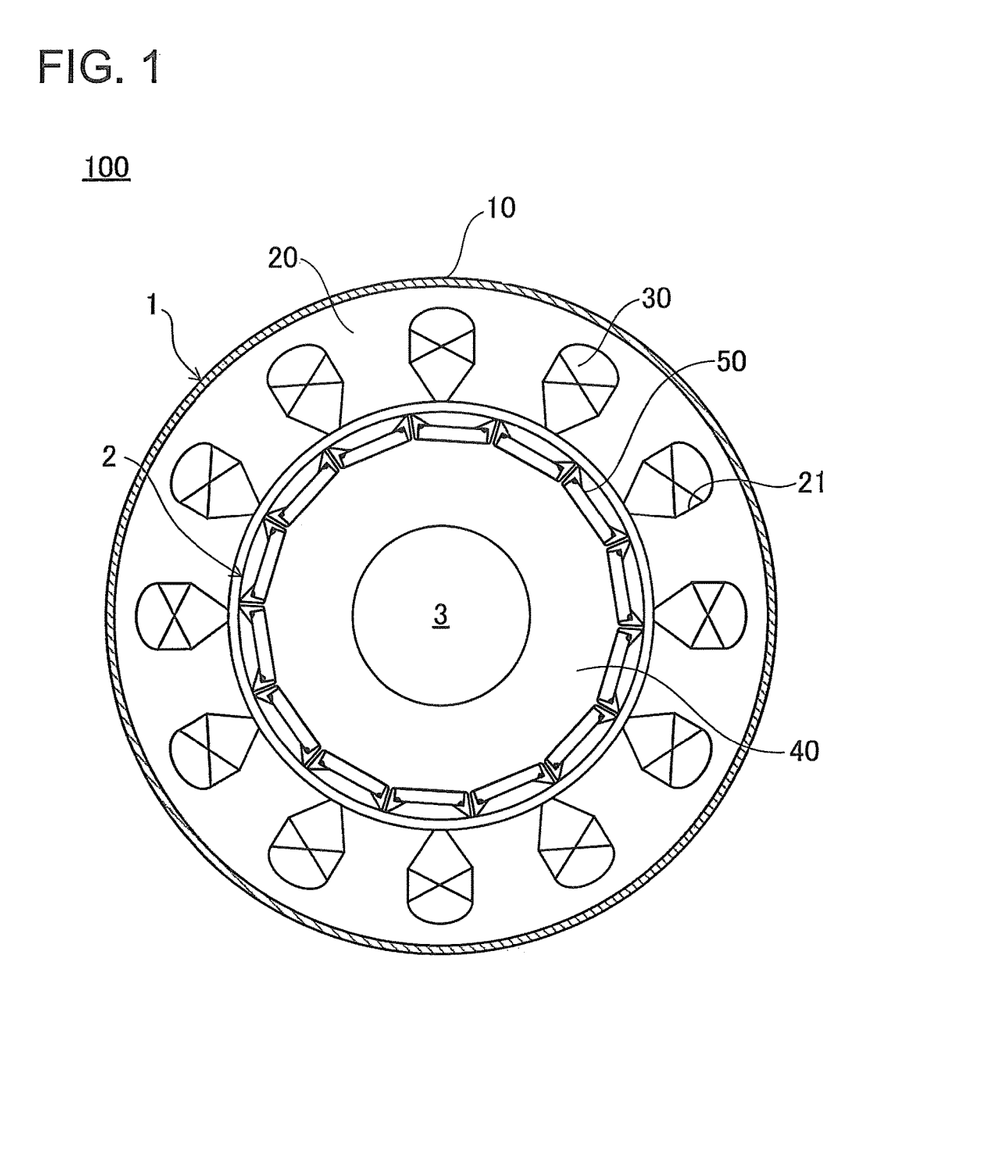
FIG. 1 is a schematic cross-sectional view of a permanent magnet type motor according to the first embodiment.
Figure 2:
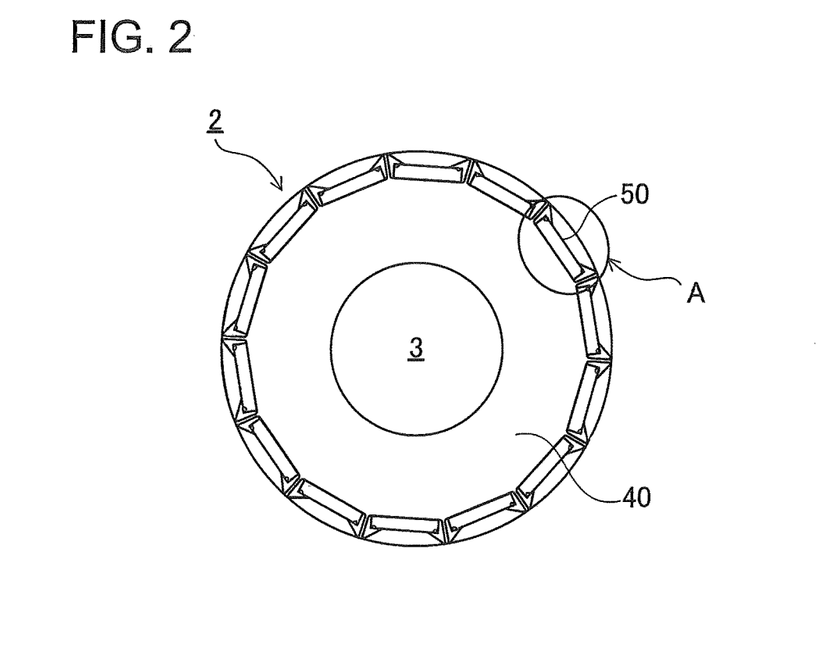
FIG. 2 is a schematic cross-sectional view of a rotor of the permanent magnet type motor according to the first embodiment.

First, a configuration of the permanent magnet type motor of the first embodiment will be described with reference to FIGS. 1 to 3. FIG. 1 is a schematic cross-sectional view of the permanent magnet type motor according to the first embodiment. FIG. 2 is a schematic cross-sectional view of a rotor of the permanent magnet type motor according to the first embodiment.

The permanent magnet type motor of the first embodiment, for example, is configured as an interior permanent magnet motor (IPM motor). A permanent magnet type motor 100 illustrated in FIG. 1 is an IPM motor with 14 poles and 12 slots, and includes a stator 1 and a rotor 2.

As illustrated in FIG. 1, the stator 1 has a yoke 10, a stator core 20, and coils 30.

The yoke 10 is a cylindrical body-shaped metallic member. The yoke 10 has a function of closing a line of magnetic force to maximize magnetic force of permanent magnets 50 described below. Furthermore, the yoke 10 also has a function of preventing peripheral devices of the permanent magnet type motor 100 from receiving an influence of magnetic field due to the electromagnetic induction.

As a constituent material of the yoke 10, soft magnetic materials such as a silicon steel plate, for example, are used, but the material is not limited to the illustrated material.

The stator core 20 is a thick cylindrical body-shaped metallic member provided along an inner surface of the yoke 10. On an inner circumferential side of the stator core 20, a plurality of slots 21 as spaces for accommodating the coils 30 are radially formed in a divided manner to face the rotor 2.

As a constituent material of the stator core 20, soft magnetic materials such as a silicon steel plate, for example, are used similarly to the yoke 10, but the material is not limited to the illustrated material.

The coils 30 are disposed inside the slots 21. The number of the slots 21 corresponds to the number of the coils 30. In the present embodiment, twelve slots 21 and coils 30 are disposed, but the number of the slots 21 and the coils 30 is not limited thereto.

As illustrated in FIGS. 1 and 2, the rotor 2 is provided around a rotation shaft 3 and has a rotor core 40 as well as the permanent magnets 50. The rotation shaft 3 serves as a rotation center of the rotor 2.

The rotor core 40 is a thick cylindrical body-shaped metallic member provided around the rotation shaft 3. As a constituent material of the rotor core 40, soft magnetic materials such as a silicon steel plate, for example, are used similarly to the yoke 10 and the stator core 20, the material is not limited to the illustrated material.

A plurality of permanent magnets 50 are incorporated into the rotor core 40. The permanent magnets 50 have a rectangular parallelepiped shape. The plurality of permanent magnets 50 are equally spaced along the circumferential direction of the rotor core 40. For example, the permanent magnets 50 are disposed along the circumferential direction of the rotor core 40 with a magnetic pole oppositely magnetized (N-N, S-S), but the disposition thereof is not limited to the illustrated disposition of the magnetization. In the present embodiment, although the permanent magnets 50 with 14 poles are disposed, the number of the permanent magnets 50 is not limited thereto.

As the permanent magnets 50, rare-earth magnets such as a neodymium magnet, for example, are adopted, but the material thereof is not limited to the illustrated material.

Next, a demagnetization structure of the permanent magnets 50 of the first embodiment will be described with reference to FIGS. 1 and 3. FIG. 3 is an enlarged view of the permanent magnet of an A part of FIG. 2. As illustrated in FIG. 3, in manufacturing the permanent magnet type motor 100, the plurality of permanent magnets 50 incorporated into the rotor core 40 is partially and approximately equally demagnetized in advance for a portion having a low demagnetization proof stress. Each of the permanent magnets 50 is stored in a storing space 41 formed in the rotor core 40. Demagnetization portions 60 are the vicinities of two corner portions of each of the permanent magnets 50 on a rotor's outer diameter side. In FIG. 3, the darker a color of the demagnetization portions 60 is, the larger a demagnetizing factor is.

The demagnetization portions 60 of the permanent magnets 50, for example, are formed by heating the permanent magnet type motor 100 at a temperature exceeding an operating environment temperature, applying a current value with a safety factor added to a maximum current standard value to the coils 30 of the stator 1, and rotating the rotor 2 (see FIG. 1).

Specifically, a temperature rise value of the permanent magnets 50 during a continuous rated operation at the upper environmental temperature limit of the permanent magnet type motor 100 is measured in advance. The permanent magnet type motor 100 is held in a constant temperature tank that is set to a temperature of the temperature rise value, and is sufficiently heated to the temperature of the temperature rise value. While the permanent magnet type motor 100 is heated to the temperature of the temperature rise value, by applying the current value with an arbitrary safety factor added to the maximum current standard value to the coils 30 of the stator 1 and by rotating the rotor 2, the demagnetization portions 60 are partially and approximately equally formed in each of the permanent magnets 50.

For example, for the permanent magnet type motor 100 in which its operating environment temperature upper limit is 40° C.; the temperature of its permanent magnets 50 during the continuous rated operation is 100° C.; and its maximum current standard value is 20 A, while the permanent magnet type motor 100 is sufficiently heated in the constant temperature tank of 100° C., the current of 40 A (=20 A×2) that is twice the safety factor is applied to the coils 30 to rotate the rotor 2 once or more. An electric conduction is performed within several seconds to ten seconds.

Alternatively, the demagnetization portions 60 of the permanent magnets 50 are formed by heating the permanent magnet type motor 100 at a temperature exceeding the operating environment temperature, applying the current controlled around a current phase angle of 70° to the coils 30 of the stator 1, and rotating the rotor 2 in a forward rotation and a reversal rotation. Specifically, by applying the current of 40 A controlled around the current phase angle of 70° to the permanent magnet type motor 100 heated at 100° C. and rotating the rotor 2 once or more in a forward direction and a reversal direction, the demagnetization portions 60 are partially and approximately equally formed in each of the permanent magnets 50. The current is applied within several seconds.

[Operation of Permanent Magnet Type Motor and Method for Manufacturing the Same]

Next, the operation of the permanent magnet type motor 100 according to the first embodiment and the method for manufacturing the permanent magnet type motor 100 according to the first embodiment will be described with reference to FIGS. 1 to 6.

As illustrated in FIG. 1, the rotor 2 of the permanent magnet type motor 100 of the first embodiment is configured so that a plurality of permanent magnets 50 are incorporated into the rotor core 40. The plurality of permanent magnets 50 are disposed such that a magnetic pole is magnetized oppositely (N-N, S-S) in the circumferential direction.

On the other hand, the stator 1 is provided so as to surround the rotor 2 and has a plurality of coils 30 radially aligned in the circumferential direction.

That is, in the permanent magnet type motor 100 of the present embodiment, the current flows through the coils 30 of the stator 1 to intersect the magnetic flux generated by the permanent magnets 50 of the rotor 2. When the magnetic flux of the permanent magnets 50 intersects the current flowing through the coils 30, the permanent magnet type motor 100 of the present embodiment generates the circumferential driving force on the coils 30 by the electromagnetic induction function to rotate the rotor 2 around the rotation shaft 3.

When the current flowing through the coils 30 of the stator 1 is increased, the permanent magnets 50 begins to demagnetize (irreversible demagnetization) at a certain current value. At an initial stage of the demagnetization, the vicinity of the corner portions of the permanent magnets 50 on a rotor's outer diameter side begins to demagnetize. When the current is further increased, the entire permanent magnets 50 are demagnetized.

In the past, as the improvement in demagnetization proof stress, an improvement in a magnet shape such as an increase in the thickness of the permanent magnet 50 and an improvement in a magnet material such as use of a material having a high intrinsic coercive force in the permanent magnet 50 have been performed.

However, according to a plan to thicken the thickness of the permanent magnet 50, the manufacturing cost rises due to a rise in a used amount of the magnet. Furthermore, it has been proven that the plan to thicken the thickness of the permanent magnet 50 is ineffective for improving the demagnetization proof stress of the corner portion of the permanent magnet 50.

Meanwhile, if a material having a high intrinsic coercive force is used for the permanent magnets 50, the demagnetization proof stress drastically improves. However, since the rare-earth magnet adopted in the permanent magnet type motor contains a heavy rare-earth such as dysprosium, the cost thereof is very high.

Accordingly, as long as the demagnetization proof stress of the vicinity of the corner angles of the permanent magnets 50 can be improved regardless of the improvements in the magnet shape and the magnet material, an increase in manufacturing cost can be suppressed.

In the permanent magnet type motor 100, particularly, the demagnetization proof stress of the vicinity of the corner portions of the permanent magnets 50 incorporated into the rotor core 40 is low. A contribution ratio to the generated torque of the vicinity of the corner portions of the permanent magnets 50 is several %.

Accordingly, in manufacturing the permanent magnet type motor 100, as long as the vicinity of the corner portions of the permanent magnets 50 incorporated into the rotor core 40 is demagnetized, the demagnetization proof stress can be improved almost without lowering the generated torque.

In the method for manufacturing the permanent magnet type motor 100 of the present embodiment, while incorporating the rotor into the stator, a current is applied to the coils 30 of the stator 1 disposed around the rotor 2, and each of the permanent magnets 50 is partially and approximately equally demagnetized.

For example, each of the permanent magnets 50 is partially and approximately equally demagnetized by the following method.

The method for manufacturing the permanent magnet type motor 100 of the present embodiment partially and equally demagnetizes each of the permanent magnets 50 by heating the permanent magnet type motor 100 at a temperature exceeding an operating environment temperature, applying the current value with the safety factor added to the maximum current standard value to the coils 30 of the stator 1, and rotating the rotor 2.

Specifically, first, the permanent magnet type motor 100 performs the continuous rated operation at the upper operating environment temperature limit, and a temperature rise value of the permanent magnets 50 during the continuous rated operation is measured. Next, the permanent magnet type motor 100 is held in the constant temperature tank set to the temperature of the measured temperature rise value, and the permanent magnet type motor 100 is sufficiently heated. Furthermore, while the permanent magnet type motor 100 is heated to the temperature of the temperature rise value, by applying the current value with an arbitrary safety factor added to the maximum current standard value to the coils 30, and rotating the rotor 2, each of the permanent magnets 50 is partially and approximately equally demagnetized.

For example, for the permanent magnet type motor 100 in which its operating environment temperature upper limit is 40° C.; the temperature of its permanent magnets 50 during the continuous rated operation is 100° C.; and the maximum current standard value is 20 A, while the permanent magnet type motor 100 is sufficiently heated in the constant temperature tank of 100° C., the current of 40 A (=20 A×2) that is twice the safety factor is applied to the coils 30 to rotate the rotor 2 once or more. The electric conduction is performed within several seconds to ten seconds.

Alternatively, the method for manufacturing the permanent magnet type motor 100 of the present embodiment partially and equally demagnetizes each of the permanent magnets 50 by heating the permanent magnet type motor 100 at the temperature exceeding the operating environment temperature, applying the current controlled around the current phase angle of 70° to the coils 30 of the stator 1, and rotating the rotor 2 in the forward and reversal directions.

Specifically, the permanent magnet type motor 100 is heated to 100° C. in the constant temperature tank, the current of 40 A controlled to around the current phase angle of 70° is applied to the coils 30 of the stator 1, and the rotor 2 is rotated once or more in the forward and reversal directions. The current is applied within several seconds.

Incidentally, with respect to the term "current phase angle" mentioned herein, the angle of the current vector from a q axis in a d-q axis plane is assumed to be the current phase angle, wherein the d-q axis plane is defined by a d axis serving as a magnetic pole center of the permanent magnets 50 and the q axis of a position shifted from the d axis by the electric angle of 90°.

Figure 3:
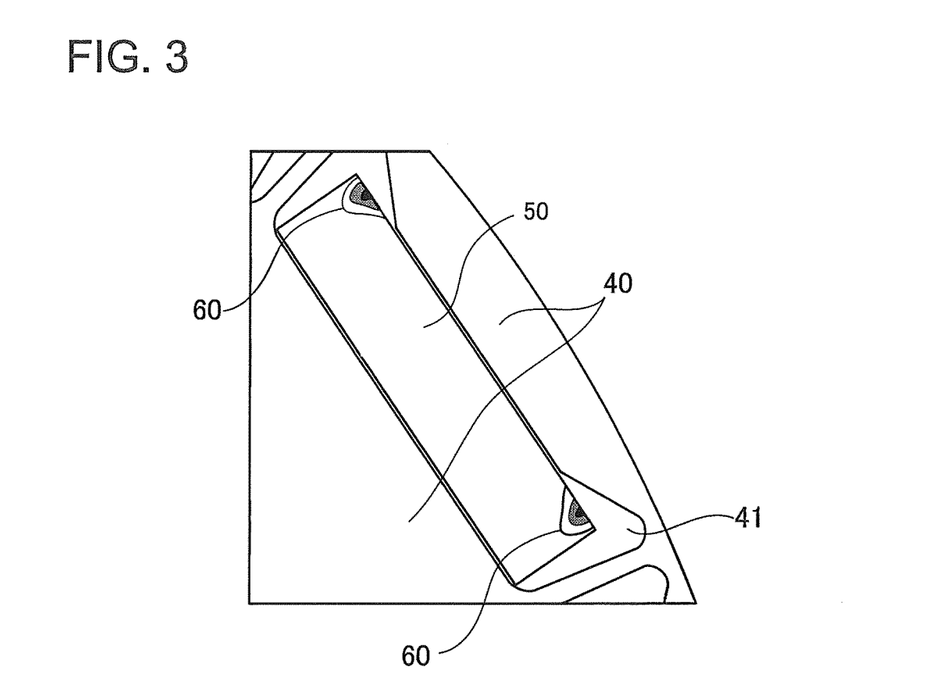
FIG. 3 is an enlarged view of a permanent magnet of an A part of FIG. 2.

As illustrated in FIG. 3, the demagnetization portions 60 formed by the method for manufacturing the permanent magnet type motor 100 of the present embodiment are in the vicinities of two corner portions of each of the permanent magnets 50 on the rotor outer diameter side. In FIG. 3, the darker the color of the demagnetization portions 60 is, the greater the demagnetizing factor is.

Next, a demagnetizing effect in the permanent magnet type motor 100 and the method for manufacturing the permanent magnet type motor 100 of the present embodiment will be described with reference to FIGS. 4 to 6.

Figure 4:
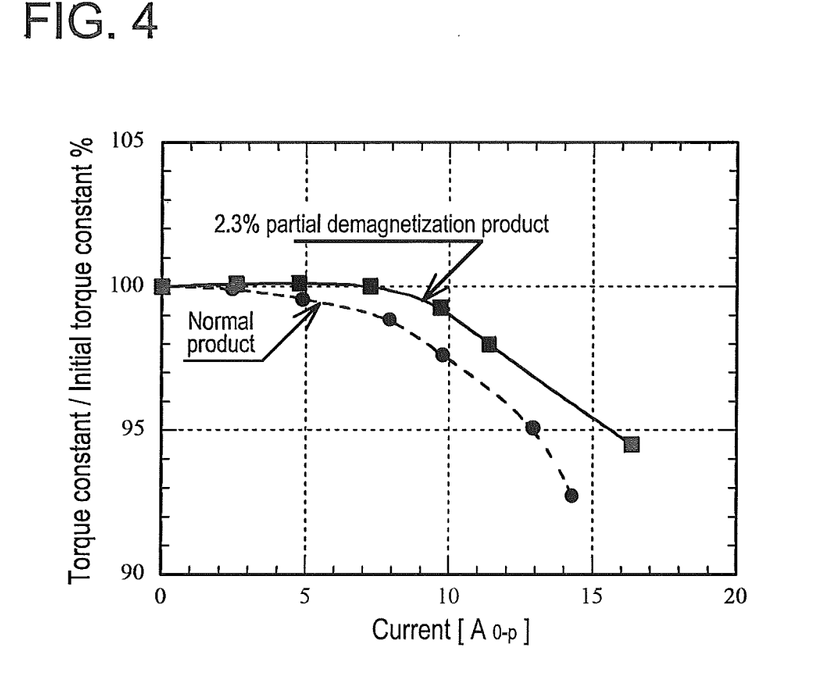
FIG. 4 is a diagram illustrating a demagnetization test result of a motor in which the permanent magnet is partially demagnetized and a motor in which the permanent magnet is not demagnetized.

FIG. 4 is a diagram illustrating a demagnetization test result of a motor in which the permanent magnet is partially demagnetized and a motor in which the permanent magnet is not demagnetized. The partially demagnetized motor partially demagnetizes the vicinity of the corner portion of the permanent magnet, and is a partial demagnetization product of 2.3% as a whole. The non-demagnetized motor is a normal product in which the permanent magnet is not demagnetized.

In FIG. 4, a horizontal axis is a current flowing through the coil, and a vertical axis is a torque constant compared to an initial state. In the motor of the normal product, a torque constant begins to drop from around 3 A (broken line of FIG. 4). On the other hand, in the motor of the 2.3% partial demagnetization product, the torque constant begins to drop from around 7 A (solid line of FIG. 4). Accordingly, it is understood that, only by slightly performing the 2.3% partial demagnetization, the demagnetization proof stress of the motor improves more than twice.

Figure 5:
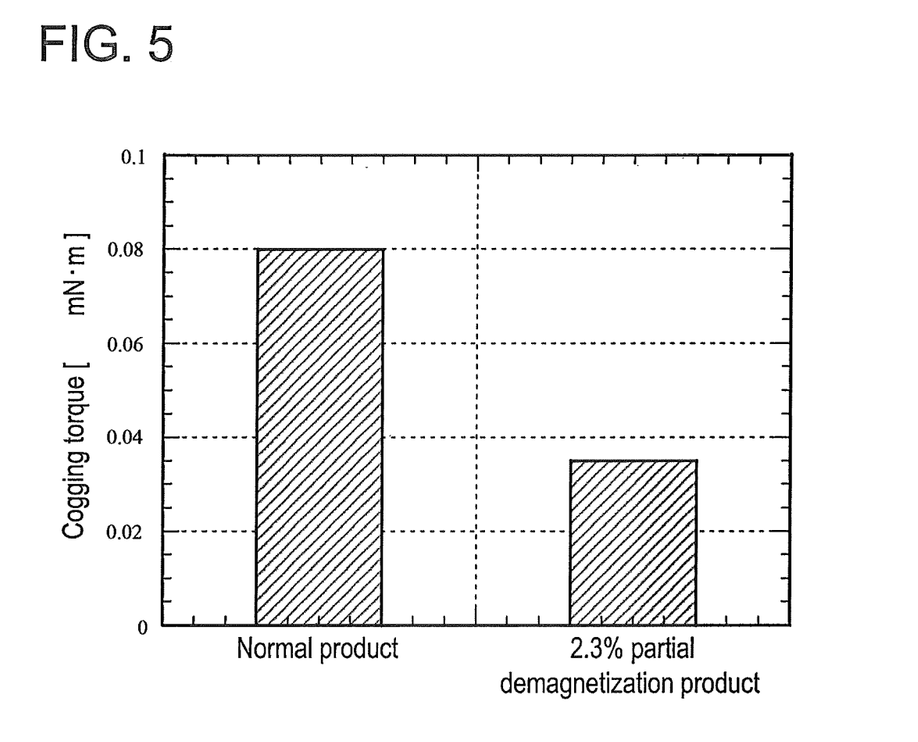
FIG. 5 is a diagram illustrating a cogging torque comparison between a motor in which the permanent magnet is partially demagnetized and a motor in which the permanent magnet is not demagnetized.

FIG. 5 is a diagram illustrating a cogging torque comparison between the motor in which the permanent magnet is partially demagnetized and the motor in which the permanent magnet is not demagnetized. Incidentally, the 2.3% partial demagnetization product and the normal product are the same as those used in the demagnetization test of FIG. 4.

As illustrated in FIG. 5, in the motor of the 2.3% partial demagnetization product, it was understood that the motor of the 2.3% partial demagnetization product is able to drastically reduce the cogging torque compared to the motor of the normal product.

Figure 6:
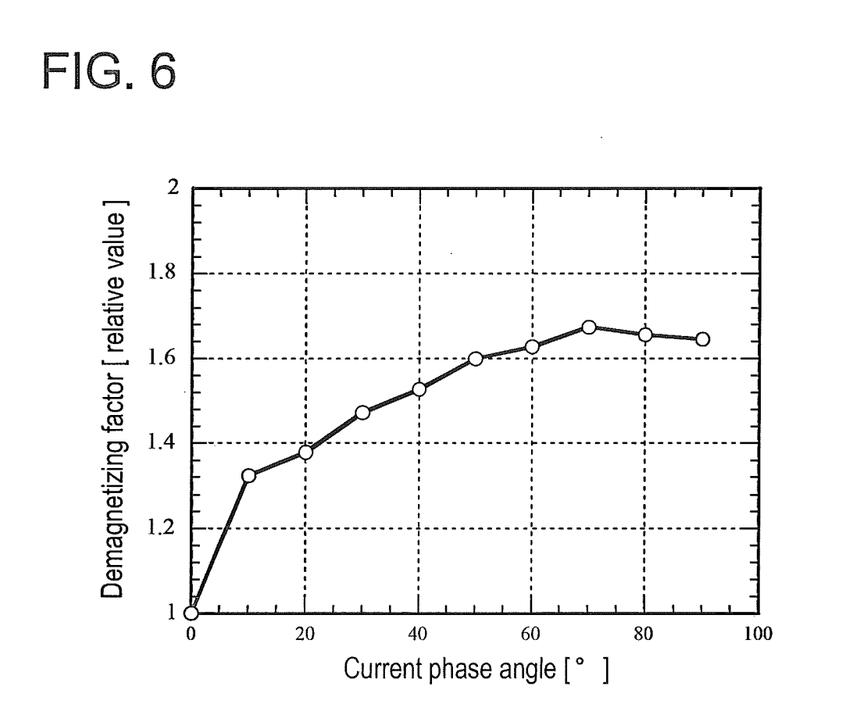
FIG. 6 is a diagram illustrating a relationship between a current phase angle and a demagnetizing factor.

FIG. 6 is a diagram illustrating a relationship between the current phase angle and the demagnetizing factor. In FIG. 6, the term "demagnetizing factor" is a relative value, assuming the torque constant at the time of the current phase angle of 0° is 1. Incidentally, the current values are the same.

As illustrated in FIG. 6, when the current phase angle is 70°, the demagnetizing factor is the highest. Accordingly, it is understood that, when the current phase angle is 70°, the demagnetization proof stress is the lowest.

Namely, after the permanent magnet type motor is assembled, by rotating the rotor at the current phase angle of 70° and allowing the current up to a predetermined current value to flow, the permanent magnet can be easily and partially demagnetized. Furthermore, by rotating the rotor at the current phase angle of 70° in the forward and reversal directions to perform the partial demagnetization, each of the permanent magnets can be equally and partially demagnetized, and the cogging torque can be reduced (see FIG. 5).

According to FIG. 6, a satisfactory value can be obtained even in the current phase angle of 80°.

According to the permanent magnet type motor 100 of the present embodiment, in manufacturing the permanent magnet type motor 100, the permanent magnets 50 are partially and approximately equally demagnetized. Particularly, by demagnetizing the vicinity of the corner portions having the low demagnetization proof stress of the permanent magnets 50 in advance, the demagnetization proof stress of the permanent magnets 50 can be improved almost without lowering the generated torque.

Furthermore, by partially and approximately equally demagnetizing the vicinity of the corner portions having the low demagnetization proof stress of the permanent magnets 50, the gap magnetic flux density distribution improves, and thus the torque ripple and the cogging torque can be reduced.

[Second Embodiment]

Figure 7A:
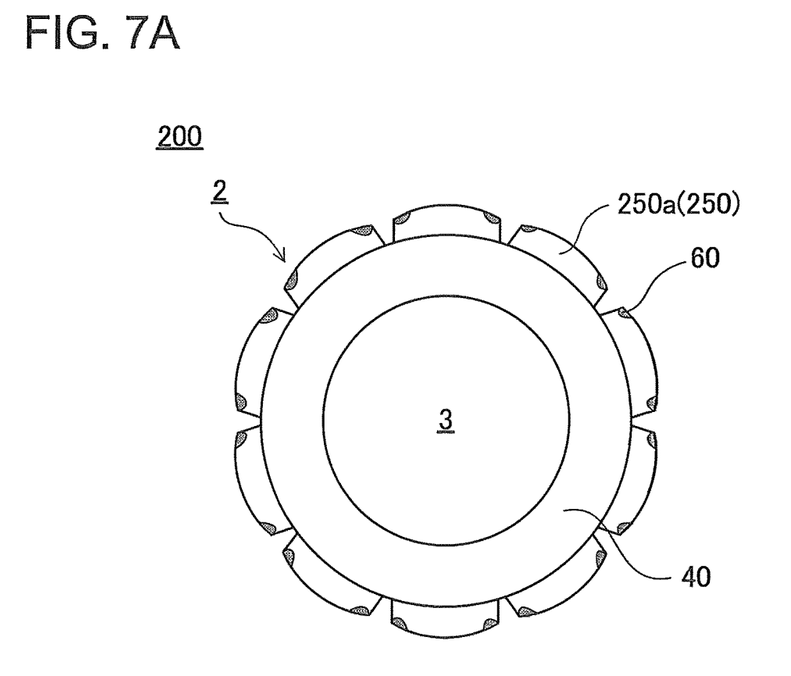
FIGS. 7A and 7B are schematic cross-sectional views of a rotor of a permanent magnet type motor according to the second embodiment.
Figure 7B:
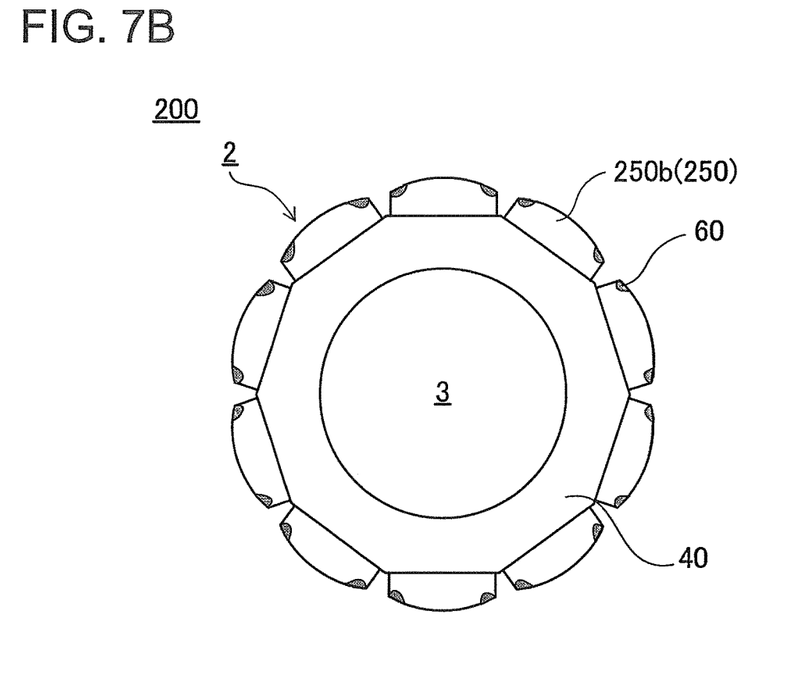

Next, a configuration of a permanent magnet type motor of the second embodiment will be described with reference to FIGS. 7A and 7B. FIGS. 7A and 7B are schematic cross-sectional views of a rotor of the permanent magnet type motor according to the second embodiment. In addition, members of the same configurations as those of the first embodiment are described using the same reference numerals.

As illustrated in FIGS. 7A and 7B, a permanent magnet type motor 200 of the second embodiment is different from the first embodiment in the configuration of the rotor 2.

The permanent magnet type motor 200 of the second embodiment is configured as, for example, a surface permanent magnet motor (SPM motor) in which a plurality of permanent magnets 250 are disposed on the surface of the rotor core 40 (or the rotation shaft 3).

In the permanent magnet type motor 200 illustrated in FIGS. 7A and 7B, although the permanent magnets 250 with 10 poles are disposed on the surface of the rotor core 40 along the circumferential direction, the number of the permanent magnets 250 is not limited thereto.

The rotor 2 of FIG. 7A includes a plurality of permanent magnets (so-called eccentric type magnets) 250a having a shape in which the center of an inner diameter thereof is different from the center of an outer diameter thereof, on the surface of the rotor core 40 having a circular cross-sectional shape.

The rotor 2 of FIG. 7B includes a plurality of permanent magnets (so-called arch type magnets) 250b having a shape in which the outside thereof is a circular arch and the inside thereof is flat, on the surface of the rotor core 40 having a polygonal cross-sectional shape.

After a demagnetization analysis was performed on the permanent magnet type motor 200 of the second embodiment, it was understood that the vicinities (black portions in FIGS. 7A and 7B) of the corner portions of the permanent magnets 250a and 250b on the rotor's outer diameter side are easily demagnetized in both permanent magnets 250a and 250b of FIGS. 7A and 7B.

Therefore, in the permanent magnet type motor 200 of the second embodiment too, the portions having the low demagnetization proof stress of the plurality of permanent magnets 250a and 250b are partially and equally demagnetized. Specifically, the demagnetization portions 60 are formed in the vicinities of the corner portions of the eccentric type magnets 250a or the arch type magnets 250b on the rotor's outer diameter side.

The demagnetization portions 60 of the eccentric type magnets 250a or the arch type magnets 250b are formed, for example, by heating the motor at a temperature exceeding the operating environment temperature, applying the current value with the safety factor added to the maximum current standard value to the coil of the stator, and rotating the rotor.

Alternatively, the demagnetization portions 60 of the eccentric type magnets 250a or the arch type magnets 250b are formed, for example, by heating the motor at a temperature exceeding the operating environment temperature, applying the current controlled around the current phase angle of 70° to the coil of the stator, and rotating the rotor in the forward and reversal directions.

Although the permanent magnet type motor 200 of the second embodiment is different from the permanent magnet type motor 100 of the first embodiment in the configuration of the rotor 2, the permanent magnet type motor 200 exhibits basically the same function effects as the first embodiment.

[Third Embodiment]

Figure 8A:
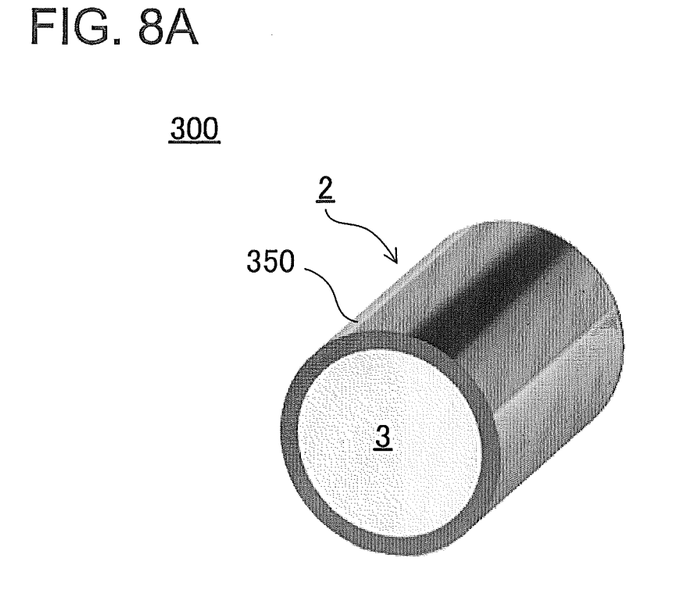
FIGS. 8A and 8B are a schematic perspective view and a schematic cross-sectional view of a rotor of a permanent magnet type motor according to the third embodiment.
Figure 8B:
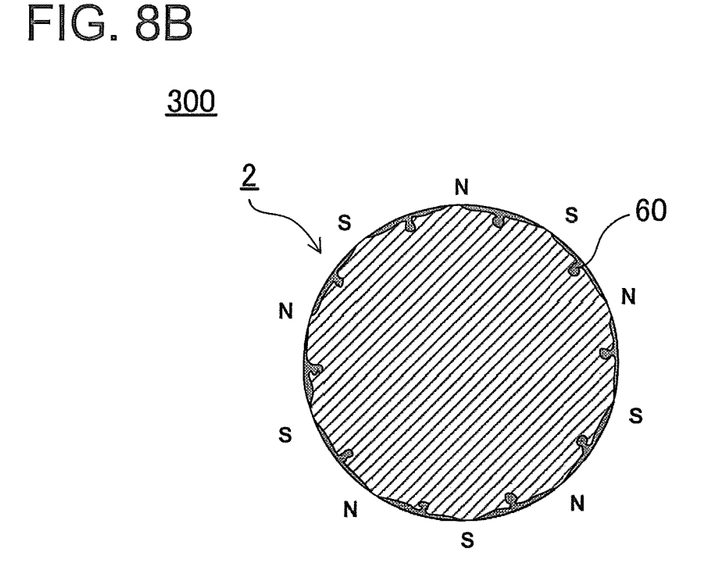

Next, a configuration of a permanent magnet type motor of the third embodiment will be described with reference to FIGS. 8A and 8B. FIGS. 8A and 8B are a schematic perspective view and a schematic cross-sectional view of the permanent magnet type motor according to the third embodiment. Incidentally, members of the same configurations as those of the first embodiment will be described using the same reference numerals.

As illustrated in FIGS. 8A and 8B, a permanent magnet type motor 300 of the third embodiment is different from that of the first embodiment in the configuration of the rotor 2.

The permanent magnet type motor 300 of the third embodiment, for example, is configured as a surface permanent magnet motor (SPM motor) in which a ring-shaped permanent magnet (radial anisotropy ring magnet) 350 is disposed on a surface of a rotor core (or the rotation shaft 3). In the permanent magnet type motor 300 illustrated in FIGS. 8A and 8B, although the ring-shaped permanent magnet 350 on the surface of the rotation shaft 3 is magnetized with 10 poles, the number of the poles of the permanent magnet 350 is not limited thereto.

A magnetic orientation of the permanent magnet 350 of the third embodiment is aligned in the radial direction, and the magnetization thereof can be performed by freely changing the number of the poles using a magnetizer.

Accordingly, the ring-shaped permanent magnet 350 of the third embodiment is different from the segment type permanent magnets as in the first and second embodiments, and an interpolar position is vague. Furthermore, since the permanent magnet 350 of the third embodiment is not completely magnetized, a magnetized state is weak.

After the demagnetization analysis was performed on the permanent magnet type motor 300 of the third embodiment, it was understood that, as illustrated in FIG. 8B, an interpolar vicinity serving as a boundary between an N pole and an S pole of the permanent magnet 350 on the rotor's outer diameter side is easily demagnetized compared to the demagnetizing field due to the stator.

Therefore, in the permanent magnet type motor 300 of the third embodiment too, the portion having the low demagnetization proof stress of the permanent magnet 350 is partially and equally demagnetized. Specifically, the demagnetization portions 60 are formed in the interpolar vicinity of the permanent magnet 350 on the rotor's outer diameter side.

The demagnetization portions 60 of the permanent magnet 350 are formed, for example, by heating the motor at a temperature exceeding the operating environment temperature, applying the current value with the safety factor added to the maximum current standard value to the coil of the stator, and rotating the rotor.

Alternatively, the demagnetization portions 60 of the permanent magnet 350 are formed, for example, by heating the motor at a temperature exceeding the operating environment temperature, applying the current controlled around the current phase angle of 70° to the coil of the stator, and rotating the rotor in the forward and reversal directions.

Although the permanent magnet type motor 300 of the third embodiment is different from the permanent magnet type motor 100 of the first embodiment in the configuration of the rotor 2, the permanent magnet type motor 300 exhibits basically the same function effects as the first embodiment.

Although preferred embodiments of the present invention have been described, these embodiments are exemplary for illustrating the present invention, and the scope of the invention is not limited to only those embodiments. The present invention can be carried out by various aspects different from the above-mentioned embodiments within the scope that does not depart from the spirit thereof.

What is claimed is:

1. A permanent magnet type motor, comprising:
   a permanent magnet disposed in a rotor core,
   the permanent magnet having first and second corners on an outer diameter side of the rotor;
   wherein a demagnetization portion of the permanent magnet is in at least one of the first and second corners of the permanent magnet;
   wherein the demagnetization portion having a low demagnetization proof stress of the permanent magnet is partially and equally demagnetized;
   wherein the demagnetization portion generates a smaller magnetic field compared to other portions of the permanent magnet.

2. The permanent magnet type motor according to claim 1,
   wherein the demagnetization portion of the permanent magnet is in an interpolar vicinity of the permanent magnet on the rotor's outer diameter side.

3. The permanent magnet type motor according to claim 1,
   wherein the demagnetization portion of the permanent magnet is formed by heating the motor at a temperature exceeding an operating environment temperature, applying a current value with a safety factor added to a maximum current standard value to a coil of a stator, and rotating the rotor.

4. The permanent magnet type motor according to claim 1,
   wherein the demagnetization portion of the permanent magnet is formed by heating the motor at a temperature exceeding an operating environment temperature, applying a current controlled around a current phase angle of 70° to a coil of a stator, and rotating the rotor in forward and reversal directions.

5. The permanent magnet type motor, of claim 1, wherein the permanent magnet is disposed in the rotor core perpendicular to a radial axis of the core.

6. The permanent magnet type motor, of claim 1, the demagnetization portion of the permanent magnet is in both of the first and second corner portions of the permanent magnet.

7. The permanent magnet type motor according to claim 1, wherein the first and second corners of the permanent magnet are portions having low demagnetization proof stress compared to other portions of the permanent magnet, and are demagnetization portions which are demagnetized compared to the other portions of the permanent magnet;
   wherein the respective demagnetization portions are equally demagnetized.

8. The permanent magnet type motor according to claim 1, wherein the demagnetization portion is formed by partially and equally demagnetizing at least one of the first and second corners of the permanent magnet.

9. A permanent magnet type motor, comprising:
   a permanent magnet disposed in a rotor core;
   wherein a demagnetization portion having a low demagnetization proof stress of the permanent magnet is partially and equally demagnetized;
   wherein the demagnetization portion generates a smaller magnetic field compared to other portions of the permanent magnet; and
   wherein the demagnetization portion of the permanent magnet is formed by heating the motor at a temperature exceeding an operating environment temperature, applying a current value with a safety factor added to a maximum current standard value to a coil of a stator, and rotating the rotor.

* * * * *